United States Patent [19]

Klein

[11] Patent Number: 4,643,182
[45] Date of Patent: * Feb. 17, 1987

[54] DISPOSABLE PROTECTIVE MASK

[75] Inventor: Max Klein, P.O. Box 3, Dalton, Mass. 01226

[73] Assignees: Max Klein; Frederick G. Crane, Jr., both of Dalton, Mass.

[*] Notice: The portion of the term of this patent subsequent to Dec. 16, 1997 has been disclaimed.

[21] Appl. No.: 486,737

[22] Filed: Apr. 20, 1983

[51] Int. Cl.⁴ .................. B01D 39/16; B01D 46/00
[52] U.S. Cl. .................. 128/201.25; 128/206.19; 428/283; 428/288; 428/290; 55/DIG. 35; 55/524
[58] Field of Search .................. 128/206.19, 201.25; 428/283, 288, 290; 55/524, 528, 529, DIG. 35

[56] References Cited

U.S. PATENT DOCUMENTS

| Re. 28,102 | 8/1974 | Mayhew | 128/206.19 |
|---|---|---|---|
| 1,101,756 | 6/1914 | Nesvadba | 128/206.19 |
| 2,056,753 | 10/1936 | Wagner | 128/206.19 |
| 3,220,409 | 11/1965 | Liloia et al. | 128/206.19 |
| 3,620,214 | 11/1971 | Thackston | 128/206.19 |
| 3,971,373 | 7/1976 | Braun | 128/206.19 |
| 4,044,188 | 8/1977 | Segal | 428/283 |
| 4,046,939 | 9/1977 | Hart | 55/524 |
| 4,215,682 | 8/1980 | Kubik et al. | 55/DIG. 35 |
| 4,239,516 | 12/1980 | Klein | 55/389 |
| 4,286,977 | 9/1981 | Klein | 55/524 |
| 4,293,378 | 10/1981 | Klein | 165/145 |
| 4,344,775 | 8/1982 | Klein | 55/75 |
| 4,354,489 | 10/1982 | Riaboy | 55/DIG. 35 |
| 4,365,627 | 12/1982 | Wing | 55/DIG. 35 |
| 4,382,440 | 5/1983 | Kapp et al. | 128/201.25 |
| 4,397,907 | 8/1983 | Rosser et al. | 428/283 X |
| 4,433,024 | 2/1984 | Eian | 428/283 X |
| 4,495,030 | 1/1985 | Giglia | 428/283 X |

OTHER PUBLICATIONS

Undated Aegis International advertisement.

Primary Examiner—Nancy Swisher
Attorney, Agent, or Firm—Dann, Dorfman, Herrell & Skillman

[57] ABSTRACT

A protective mask formed from a porous non-woven sheet material which is made of glass fibers and a suitable binding agent, and which may optionally include a gas adsorbent substance. The mask protects the respiratory system of the wearer from the effects of toxic gases and the like.

28 Claims, 4 Drawing Figures

DISPOSABLE PROTECTIVE MASK

BACKGROUND OF INVENTION

The present invention relates to a disposable or expendable protective mask which is simple, lightweight and inexpensive, yet effective for protecting the wearer's respiratory system and eyes from the effects of toxic gases and other harmful substances. More specifically, the present invention comprises a protective mask formed from a porous, non-woven sheet material consisting essentially of glass fibers, and a suitable binding agent. The sheet material serves to filter the air of noxious agents, including sub-micron sized particulate matter. The sheet material may optionally include a gas adsorbent substance in an amount sufficient to remove toxic gases from the inhaled air.

Protective masks are widely used by the military and in industry, e.g. in chemical processing plants and in mining operations where noxious fumes may occur. Conventional gas masks generally consist of a face piece equipped with a canister for filtering and adsorbing gas from inhaled air and straps for attaching the mask to the wearer's head. One or more outlet valves are also provided for discharging exhaled air. The face piece is designed to form a gas-tight seal around the wearer's face, in order to ensure that only air that has been passed through the canister is inhaled.

Prior art gas masks generally accomplish removal of noxious substances from the inhaled air by a combination of physical and chemical means. Particulate matter or droplets suspended in the air are removed by mechanical filtering using a fibrous filter media made, for example, from asbestos, cellulose or glass fibers. Gases or vapors are removed by adsorption on surface-active materials having high retention capacity, such as activated carbon. Various chemical agents may be employed to eliminate specific gases or fumes by formation of chemical compounds, e.g. alkalies for the removal of acid fumes, heavy metal-containing compounds for the removal of ammonia, and copper salts for the removal of hydrocyanic acid.

Although satisfactory in many respects, prior art gas masks of the type described above are not without certain shortcomings. For example, the prior art masks tend to be ineffective in removing sub-micron sized particles from the inhaled air. In this connection, there is concern that such masks would provide inadequate protection against the newer generations of chemical and biological warfare agents which are released in atomized form and have particle sizes as small as 0.3 microns. Furthermore, the prior art gas masks are quite expensive to manufacture, and, being a relatively sophisticated piece of equipment, require considerable familiarity and practice on the part of the wearer in order to be used effectively. Such factors have prevented gas masks from being made available to the general population for facilitating escape from fires. It is well-documented that the vast majority of fire-related deaths do not result from burns, but are due to the inhalation of smoke and toxic gases, as many fatalities occur in areas far removed from the actual fire scene, particularly in public buildings, such as hotels, theaters and night clubs.

SUMMARY OF THE INVENTION

In accordance with the present invention there is provided a protective mask or face covering for facilitating escape from environments in which the air is contaminated with various kinds of noxious substances. The mask is formed from sheet material consisting essentially of glass fibers and a suitable binding agent. The sheet material is adapted to sealingly engage the wearer and envelop at least a portion of the face of the wearer, including the nose and mouth and means are provided for securing the mask in place during use. The mask may be formed so as to provide a full head covering, or it may cover only a portion of the face of the wearer. In the latter case, the mask may be made sufficiently rigid to be resiliently retained on the wearer's face, providing an adequate seal, or it may conveniently be provided with sealing means to engage the skin of the wearer along the periphery of the enveloping portion of the sheet material, to prevent the inhalation of unfiltered air, which could otherwise enter the mask around its periphery.

In one embodiment, the sheet material of the mask envelops only the nose and mouth of the wearer, much the same a surgical mask or a painter's mask. In another embodiment, the sheet material envelops a major portion of the face of the wearer, including the eyes. Masks of this type have an opening in the sheet material to permit wearer vision, with a transparent window sealed in the opening. In a preferred embodiment of the mask, the sheet material, as alreadly indicated, may envelop the entire head of the wearer and include means such as a drawstring for drawing the sheet material snuggly around the neck of the wearer.

In general, the effective surface area of the enveloping portion of the mask should be as large as possible in order to maximize the filtration efficiency of the mask. This is because the larger the surface area of the enveloping portion of the mask, the lower will be the face velocity to which the sheet material is exposed. The term "face velocity", as used herein, refers to the air flow volume through the sheet material of the mask, divided by the surface area of the mask. Inasmuch as face velocity is inversely related to filtration efficiency, a decrease in face velocity will produce a corresponding increase in filtration efficiency.

The porosity of the sheet material may be varied so as to permit ready flow of air into and out of the mask without the need for valves or ducts of any kind. By appropriate selection of the components making up the sheet material of the mask, the porosity of the sheet material may be such as to ensure removal from the inhaled air of relatively small sized particulate matter, i.e. as small as 0.3 microns, or greater with as high as 99.97 efficiency. Optionally, a gas adsorbent substance may be distributed throughout the enveloping portion of the mask, as described in detail below. This latter modification of the mask protects against the inhalation of toxic gases such as hydrogen cyanide, hydrogen chloride and acrolein, which are often generated in building fires.

In a preferred embodiment of the present invention, the protective mask is fashioned from sheet material having substantial small particle retention capability and containing sufficient gas adsorbent substance to eliminate toxic gases from the inhaled air. Such characteristics may be incorporated in a single-ply sheet material by appropriate selection of components, or a multi-ply sheet material may be used in which at least one ply is effective for removing from the inhaled air particulate matter having a particulate size of 0.3 microns, or greater, and at least one other ply which includes a gas adsorbent substance and is effective for removing toxic gases, vapors and the like.

In any of the aforementioned forms of protective mask, there may be included an adsorbent-free, porous inner liner applied to the side of the sheet material facing the wearer, in order to prevent the gas adsorbent substance from rubbing off on the skin of the wearer.

If desired, the mask may also be provided with a porous, heat-resistant and/or reflective outer covering. Generally speaking, however, the glass fiber sheet material itself provides a certain measure of heat insulation, which is of particular importance when the mask is to be used in escaping fires.

The protective mask of the present invention is inexpensive to manufacture, requires little or no familiarity on the part of the wearer and is quite effective in protecting the wearer from the effects of noxious gases, fumes or smoke. The mask is useful for a variety of military and industrial purposes, as well as being of general utility in improving fire safety.

DETAILED DESCRIPTION OF THE INVENTION

The novel features and advantages of the present invention will be understood from a reading of the following detailed description thereof, in conjunction with the accompanying drawing illustrating several different embodiments of the protective mask.

Like reference numbers designate like parts in those figures of the drawing in which they appear.

Figure 1:
FIG. 1 is a face view of the protective mask covering the nose and mouth of the wearer.

Referring more specifically to the drawing, FIG. 1 shows a protective mask 1 composed of sheet material 2 which envelops only part of the face of the wearer, including the nose and mouth. The sheet material 2 contains optional gas adsorbent substance 3. Suitable gas adsorbent substances are described hereinbelow. A sealing strip 4 is provided along the periphery of the mask, and a band or strap 5 serves to secure the mask to the head of the wearer.

Figure 2:
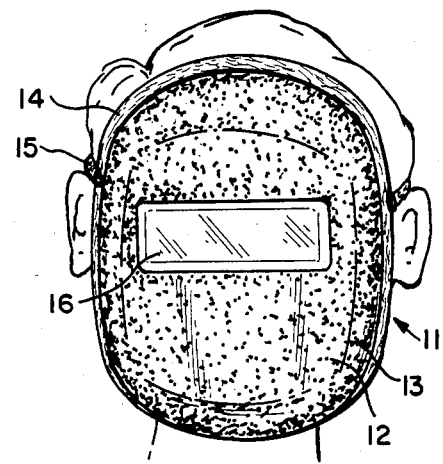
FIG. 2 is face view showing the protective mask as a full face covering having a transparent window permitting wearer vision through the mask.

In FIG. 2 there is shown a mask 11, formed of sheet material 12, enveloping the full face of the wearer and containing a gas adsorbent substance 13 throughout. An opening is provided in the sheet material 12 and a window 16 is sealingly inserted in the opening to permit wearer vision. Window 16 may be fabricated from a variety of materials. Non-porous plastic sheet material, made, for example, from polycarbonate resin (available from G.E. Co. under the name Lexan TM) or poly(methyl mehacrylate)-type polymers (available from Rohm & Haas Co. under the name Plexiglass TM), may be cut to size to serve as the window element. If desired, an anti-fogging coating may be applied to the window surfaces. The mask shown in FIG. 2 also includes a sealing strip 14 along its periphery and a strap 15 to hold the mask in place during use.

Figure 3:
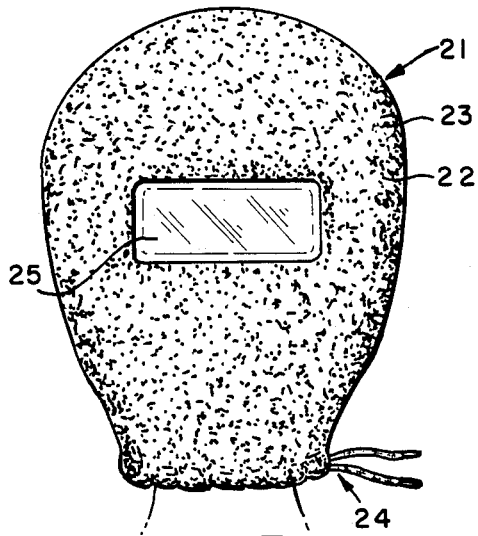
FIG. 3 is a face view showing the protective mask as a full head covering and also having a transparent window permitting wearer vision through the mask.

FIG. 3 illustrates a protective mask 21 in the form of a full head covering in which the sheet material 22 is generally in a bag-like configuration. As in the other forms of the protective mask described above, mask 21 contains gas adsorbent substance 23 throughout its thickness and over its entire surface. Mask 21 may be provided with a drawstring 24 to secure the mask snuggly around the neck of the wearer, as described in more detail below. In the particular embodiment shown in FIG. 3, drawstring 24 serves at once to sealingly engage the wearer and secure the mask in place during use. A window 25 is also provided in mask 21 to permit wearer vision.

Figure 4:
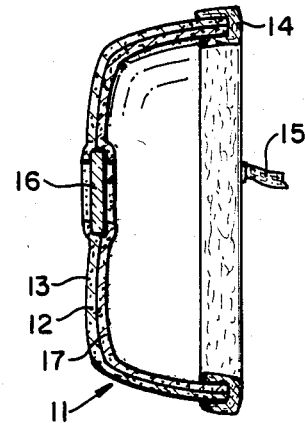
FIG. 4 is a view in cross-section of the protective mask of FIG. 2, including an adsorbent-free porous inner liner.

Any of the forms of the mask described above may include a porous adsorbent-free inner liner to prevent the gas adsorbent substance contained in the sheet material from rubbing off on the skin of the wearer. As illustrated in FIG. 4, which shows the mask of FIG. 2 in cross-section, liner 17 is provided, which covers the entire inner surface of sheet material 12 containing the gas adsorbent substance 13.

Glass fibers ranging in size from about 0.025 cm. to about 0.635 cm. in length and from about 0.5 microns to about 4 microns in diameter are preferred for making the sheet material of the protective mask. In order to optimize filtration of sub-micron sized particulate matter, glass micro-fibers should be employed. Blends including sub-micron glass fibers have been found to be particularly effective. A suitable glass fiber blend is composed of (a) about 50 parts of fibers 0.635 cm. (about 0.25 in.) in length and about 4 microns in diameter (b) about 50 parts of fiber 0.152 cm. (about 0.06 in.) in length and from about 2 to 3 microns in diameter, and (c) about 150 parts of fibers 0.102 cm. (about 0.04 in.) in length and about 0.5 microns in diameter. The quarter inch glass fibers are available from Owens-Corning Fiberglass Corp. (Type DE 636 glass fibers) and the smaller size fibers are available from Manville Corporation (Code 110 and Code 106 glass fibers, respectively). Larger size glass fibers, i.e. one inch or more in length and 6 to 12 microns in diameter, may be employed when removal of sub-micron sized particles is not a serious concern, or where the glass fibers merely serve as a matrix for a gas adsorbent substance, as, for example, in a protective mask to be worn in escaping fires.

Any of the organic chemical binding agents normally used in making paper-like glass fiber sheets or webs may be used in the sheet material of the mask. Good results have been obtained using polyvinyl alcohol. Polyvinyl alcohol which is at least 98% hydrolyzed is especially satisfactory. Another suitable binding agent is prepared from polymer micro-bits (defined further hereinbelow) and cellulose fibers, which are intimately blended to produce what is referred to herein as a "cobeat". The cobeat is so named because, after forming a uniform dispersion of the cellulose fibers and polymer micro-bits in a paper-making pulper, for example, the dispersion is fed into a beater and subjected to beating action until its freeness is within the range of about 400 to about 450. Freeness is generally understood by those skilled in the art to be a measure of the rate of flow of water through a pulp and is determined in accordance with Tappi Standard T227-m-58 (also referred to as the Canadian Standard Freeness). The cobeat preferably is composed of about one part micro-bits and from about one to about two parts cellulose fibers.

An advantage in using the cobeat as the binding agent for the sheet material of the mask in addition to its binding function, is that it aids in establishing the requisite porosity for small particle filtration. The cobeat also serves to enhance retention of particulate components of the sheet material when present therein.

In certain formulations of the sheet material, it is desirable to use a combination of binding agents, e.g. polyvinyl alcohol together with a cobeat.

The cobeat dispersion may be used as is, or it may be converted to web or sheet form using conventional paper-making processes and apparatus, the latter being preferred. After adequate drying, the cobeat web or sheet becomes a storable product which is available when needed for use as a component of the sheet material of the mask.

The polymer micro-bits used in preparing the cobeat are produced from an expanded, non-brittle, thermoplastic polymer selected from the group of a styrene polymer, a lower polyolefin, i.e. the polymer of an ethylenically unsaturated hydrocarbon monomer having from 2 to 6 carbon atoms, or copolymers or blends of those polymers, or micro-bits of a flexible foamed polyurethane.

Micro-bits of an expanded, non-brittle, thermoplastic styrene polymer or lower polyolefin are more fully described, along with their method of preparation, in my U.S. Pat. No. 4,207,378. These micro-bits may be broadly described as being (a) from about 40 to about 325 microns long and from about 20 to about 320 microns wide, (b) substantially completely free of intact cells of the expanded polymer from which they were produced, (c) substantially non-uniform in outline of the individual micro-bit particles, and (d) in density, at least 85% of the density of the specific unexpanded polymer from which the aforesaid expanded polymers are produced.

The polyurethane micro-bits and their preparation are more fully described in my U.S. Pat. No. 4,200,679.

The individual polyurethane micro-bit particles may be generally described as tripodal particles with generally uneven length legs and an no uniformity in outline, the particles being broken and consisting of inter-connected strand portions from adjacent cells of the flexible foamed polyurethane. The strand portions are substantially free of intact cell windows and have hook-like projections with indentations and flutes. The uneven leg lengths and hook-like projections and flutes result from the destruction of the cell windows of the flexible polyurethane foam from which the polyurethane micro-bits are produced.

The entire disclosures of both of my aforesaid polymer micro-bits patents are incorporated in the present applicaiton by reference, as if actually set forth herein in full.

Polymer micro-bits may be used as a separate component, apart from the binding agent in making the sheet material of the mask. The addition of polymer micro-bits as a separate component enhances the porosity of the sheet material. Thus, polymer micro-bits may be used in varying amounts to provide the sheet material with the degree of porosity required for the specific application in which the mask is to be used. In addition, the polymer micro-bits, being oleophilic in nature, are effective in removing various organic vapors from the inhaled air. The micro-bits also aid in retaining the gas adsorbent substances, when present in the sheet material of the mask.

The cellulose fibers of the cobeat are of the type ordinarily used in paper-making and are preferably of writing paper grade, such as cotton fibers from cotton rags or linters. These cellulose fibers are conveniently prepared in the form of a wet lap composed principally of fiber cuttings and cotton linters which are washed (bleached if necessary), separated, e.g. by a hollander, into fibers of from about 4 mm. to about 1 cm. in length, and fed to a wet lap-making machine for formation of a web, which is then compressed between pressure rolls to a thickness of about 2 mm. and a water content of about 80 weight percent.

It is also advantageous to include in the sheet material of the mask a wet strength enhancing agent. Cationic melamine-formaldehyde resin has been found to impart excellent wet strength properties to the sheet material. A preferred melamine-formaldehyde resin for use in the present invention is prepared by the condensation of melamine and formaldehyde in an aqueous acid medium, as described in U.S. Pat. Nos. 2,354,543, and 2,559,220. The amount of the wet strength enhancing agent used should be sufficient to impart substantial integrity to the sheet material when wet, but not so much as to impair its filteration effectiveness.

The gas adsorbent substances which may be incorporated in the protective mask of the present invention include finely divided activated carbon particles, crystalline molecular sieve particles or zeolite particles. The loading of gas adsorbent substances in the sheet material of the mask may be as high as 70 percent by weight.

Any of the gas-adsorbing activated carbons from a variety of sources, such as charcoal, coal, petroleum distillation residue or pecan nut shells, may be used.

The zeolites which may be included in the mask are natural hydrated aluminum silicates of the general formula $Na_2O \cdot Al_2O_3 \cdot nSiO_2 \cdot xH_2O$ or synthetic ion exchange resins having gas adsorbent capabilities.

The applicable gas adsorbent crystalline molecular sieve particles include both natural and synthetic molecular sieves.

The sheet material of the mask may also contain ion-exchange resin particles. For example, anion exchange resin particles may be used to advantage in removing from the air microorganisms of an injurious character, such as those employed in biological warfare, which often comprise negatively charged bodies.

In general, the tensile strength of the sheet material may vary from about 0.2 to about 5.5 kilograms per centimeter and the porosity may vary from about 15 to about 1500 liters per minute per square decimeter of surface at differential pressure of 2.54 centimeters (water).

The wet tear strength of the sheet material may be enhanced by the inclusion of one or more fibrous additives, such as polyester terephthalate or rayon fibers. Polyethylene terephthalate fibers have been found to give excellent results. The fibers additives are conveniently incorporated into the sheet material formulation during preparation of the cobeat.

In general, the amounts of the various sheet material components must be sufficient for each to perform its intended function. However, because the relative amount of one component of the sheet material generally affects the possible maximum and minimum amounts of each of the other components, and thus its function, it is difficult to give specific ranges for the various components which may be included in the sheet material.

A sheet material particularly suited for use in the present invention because of its exceptional sub-micron sized particle filtration capability is the high efficiency particulate air filter described and claimed in my U.S. Pat. No. 4,286,977, issued Sept. 1, 1981, the entire disclosure of which is incorporated in the present application by reference, as if written out herein in full. This material may generally comprise, by weight, about 250 parts of a glass fiber blend of the kind described hereinabove, 9.35 to 10 parts of an intimate blend or cobeat of polymer micro-bits and cellulose fibers, blended in the ratio of 1 part micro-bits to 1 part cobeat, and up to 2 parts of an organic binding agent. If desired, a gas-adsorbent substance may be included in this sheet material.

Another suitable sheet material for use in the present invention is the enhanced wet strength filter mat described in my U.S. Pat. No. 4,293,378, issued Oct. 6, 1981, the entire disclosure of which is incorporated in the present application by reference, as if written out in full herein. This material may comprise from about 64.1 to about 83.5% of glass fibers (e.g. equal parts of two different sizes of fiber, one measuring 2.54 cm. in length and 12 microns in diameter and the other measuring 0.95 cm. in length and 6 microns in diameter), from about 6.6% to about 9.5% of the above-described cobeat, from about 2.8% to about 8.1% of polyvinyl alcohol (98% hydrolyzed), from about 5.5% to about 12.8% of the above-described polymer micro-bits, and from about 3.35% to about 5.5% of a colloidal cationic melamine-formaldehyde resin. Particulate gas-adsorbent substances, such as those mentioned hereinabove, may be conveniently incorporated in this sheet material, as exemplified below.

A sheet material effective for removing various kinds of organic gases and vapors from the inhaled air is the gas-vapor adsortpion and treating mat described and claimed in my U.S. Pat. No. 4,344,775, issued Aug. 17, 1982, the entire disclosure of which is also incorporated in the present application by reference, as if written out herein in full. This material may comprise, by weight, from about 2 to about 50% of polymer micro-bits, from about 2 to about 10% organic chemical binding agent (or 5.8 to 11% if cobeat is used as the binder), and about 2% of gas adsorbent substance to an amount less than that at which appreciable dusting of the substance from the sheet material occurs, with the balance of the sheet material being made up of glass fibers.

Generally speaking, the above sheet materials are prepared by forming an aqueous dispersion of the desired constituents and converting it to sheet or web form by processes ordinarily used in paper making. Such processes ordinarily involve thorough blending of the dispersion in a mixing chest to ensure uniformity, application of the dispersion to a porous substrate (usually an endless belt) to form a sheet or web, removal of the wet sheet or web from the porous substrate and drying of the sheet or web. The procedure for making the sheet material may be carried out conveniently on a Fourdrinier machine or similar apparatus commonly used in paper making. Individual sheets may be made on a hand sheet screen by following essentially the same procedure. Details of the preparation of sheet materials suitable for use in the present invention are set forth in my aforementioned U.S. Pat. Nos. 4,286,977, 4,293,378 and 4,344,775.

Fabriciation of a protective mask from the finished sheet material may be accomplished quite simply by paper forming techniques well known to those skilled in the art. In order to prepare a mask in the form shown in FIGS. 1 or 2, for example, the sheet material is wetted, applied to a suitable form and dried. Excess sheet material may be trimmed from the mask either before or after drying. The formed sheet material may be easily cut to provide an opening for vision, as shown in FIG. 2. The window insert is sealed along the periphery of the opening using any commerically available hot melt adhesives.

A mask of the type shown in FIG. 3 may be fabricated according to conventional bag or sack making procedures. The open end of the full head covering may easily be hemmed or provided with small eyelets for insertion of a drawstring.

When a mask is fabricated in one of the forms shown in FIGS. 1 or 2 above, it is preferably provided with sealing means to engage the skin of the wearer along the periphery of the enveloping portion of the sheet material. As previously mentioned, the sealing means serves to prevent unfiltered air from entering the mask around its periphery. A suitable seal is provided by a band of non-porous elastic secured along the periphery of the mask and of sufficient width to follow the contour of the face when the mask is worn. Similarly, the sealing means may be a band affixed along the periphery of the enveloping portion of the mask and provided with an adhesive substance to make sealing contact with the skin when the mask is worn. The adhesive material may be covered with a peal-off tape to prevent drying of the adhesive while the mask is in storage. A continuous flexible rubber strip may be provided along the inner edge of the open end of the full head covering mask, in order to provide a tighter seal against the neck of the wearer when the drawstring is tied.

The mask is sufficiently inexpensive that it may be discarded after a single use.

The following examples further describe the manner and process of making and using the present invention and set forth the best mode contemplated by the inventor for carrying out the invention, but are not to be construed as limiting the invention. The mixing apparatus referred to in the following examples, e.g. pulper and beater, are those commonly employed in papermaking.

Examples 1 and 2 described the preparation of representative sheet materials which may be used in making a protective mask in accordance with the present invention.

EXAMPLE 1

Preparation of High Efficiency Particulate Air Filter Sheet Material (i) Preparation of Polyester-Containing Cobeat Dispersion: A cobeat dispersion was prepared by (a) charging 181.8 kilograms (dry basis) of wet lap cotton fibers as used in paper-making (containing 727.2 liters of water in the fibers) and 181.8 kilograms (dry basis) of polystyrene micro-bits (6% solids with 2848.5 liters of bound water) into 13,354 liters of water in a pulper and agitating the resulting mixture for 3 minutes thereby dispersing the cotton fibers and polymer micro-bits free of clumps and clusters in the water.

This dispersion of cotton fibers and micro-bits was pumped to a paper-making beater having its pressure roll set at 65% of maximum and run at 110 r.p.m. for 6 hours after which the freeness had dropped to 600. The roll setting then was changed to provide more fibrillation and less cutting action, by using only the brush roll pressure with the roll barely contacting the bed. Beating was continued for about 2 hours when the freeness was reduced to 450. The cobeat dispersion was retained in the beater under agitation sufficient for it to remain in suspension for later use.

Into a beater chest were fed 30,280 liters of water, and 189.3 liters of the foregoing cobeat dispersion to provide a diluted cobeat dispersion to which was added 27.2 kilograms of readily water-dispersible, semi-dull, optically whitened polyethylene terephthalate polyester fibers. The fibers used were 1.27 cm. long fibers of 1.5 denier which are spun by conventional melt process, have a special finish compatible with most anionic, cationic or nonionic binders and are further characterized by: solution viscosity of 770±20 of ½ gram dissolved in 50 ml. of solvent (by weight 40 parts to tetrachloroethane and 60 parts phenol) at 25° C.; melting point of 48.67° C.; non-shrinkability in boiling water; elongation at break of 45% (available as TREVIRA 101, product of American Hoechst Corporation, Fibers Division, Spartenburg, S.C. 29301). The incorporation of polyethylene terephthalate fibers in the suspension generally requires a relatively low solids content.

The resulting uniform mixture then was transferred to the machine chest of a Fourdrinier machine. From there it was pumped to the head box, diluted to a consistency suitable for paper-making and discharged onto the Fourdrinier screen.

The resulting web was passed over 2 dryer cans heated to 116° C. and then through a 10 foot long Overly dryer (Overly Corp., Ramsey, N.J.) operated at 205° C. at a speed of 16.3 meters per minute to provide a dry polyester-containing cobeat which was placed in storage for later use.

(ii) Preparation of Furnish Suspension: Into 11,355 liters of water in a pulper there was admixed in sequence 2.27 kilograms (dry basis) of the foregoing intermediate supply suspension containing 1.06 kilograms of cotton fibers an equal number of kilograms of polystyrene micro-bits and 0.15 kilograms of the above-described polytheylene terephthalate fibers, together with 4.54 kilograms of sodium hexametaphosphate and 1.9 liters of concentrated sulfuric acid and the mixing was continued for about 2 minutes to dissolve the hexametaphosphate and provide a uniform slurry.

To the slurry (having a pH of about 3) in the pulper there was admixed 22.7 kilograms of glass fibers (about 26.35 cm. long and about 4.3 microns in diameter). Mixing was continued for about 10 minutes to provide a uniform dispersion. Then to allow further use of the pulper the slurry was transferred to a beater chest and agitated sufficiently to maintain it in suspension.

Into another 11,355 liters of water in the pulper there was admixed 3.18 kilograms (dry basis) of the foregoing cobeat containing 1.14 kilograms of cotton fibers, and an equal number of kilograms of polystyrene micro-bits, to which had been added 0.91 kilograms of polyvinyl alcohol fibers (98% hydrolyzed), with the mixing continued for several minutes to provide a uniform suspension. Then there was admixed with the contents of the pulper 22.7 kilograms of a first type of glass micro-fibers (about 0.15 cm. long and from about 2 to 3 microns in diameter) and 68.1 kilograms of a second type of glass micro-fibers (about 0.10 cm. long and from about 4 to 6 microns in diameter) and the mixing was continued until a uniform suspension was obtained. This suspension was transferred to and admixed with the slurry in the beater chest.

7600 liters of rinse water then were added to the pulper and agitated to suspend any glass fibers and/or cobeat which settled out and remained behind while the contents of the pulper were pumped to the beater chest. The resulting so-called pulper rinse mix then was pumped to the beater chest and there admixed into the prior combined pulper mix. Then there was admixed into this resulting slurry in the beater chest (or upon transfer of the slurry to the machine chest) the amount of water needed to provide a 0.5% solids content.

The slurry was pumped from the beater chest to the machine chest of a Fourdrinier machine and was maintained under agitation therein. From the machine chest, the slurry was fed to the furnish box of the Fourdrinier at a rate of 4.32 kilograms per minute and there combined with clear dilution water at a rate of 6056 liters per minute.

The resulting uniform furnish was fed onto the traveling Fourdrinier screen (86 strands in the machine direction and 60 strands across) moving at a rate of 15.24 meters per minute.

After the sheet material passed the suction boxes under the end of the Fourdrinier screen opposite the furnish box it continued onto an endless belt conveyor (a 112 by 84 mesh screen) also running at 15.24 meters per minute. Then after about 1.5 meters beyond the end of the Fourdrinier, the wet sheet material (still on the conveyor) passed about 10 cm. below a battery (about 60.5 cm. long) of infrared lamps (52.4 kilowatts, at 3.8 amperes, 480 volts, single phase 60 cycle) for about 2.4 seconds, causing rapid dissolution of the polyvinyl alcohol, which ultimately tended to accumulate at the intersections between the fibers of the sheet material.

The partially dry sheet material continued through a tunnel dryer (about 3.67 meters long by 1.83 meters wide) providing a temperature of about 121° C. and then alternated in sequence over one and then under the next of each of a series of six dryer drums (the first drum providing a temperature of 121° C. with the temperature increased at each drum, in turn, with the last drum maintained at 127° C.). The finally dry sheet material then passed through a pair of tension rollers and onto a wind up drum. The dry sheet material had a smooth surface on each side and wound up easily around the drum without any tears or wrinkles.

The resulting mat was 0.46 millimeter thick with basis weight of 10.45 kilograms per 120.9 square meters, tensile strength in the machine direction of 0.736 kilograms per cm. and in the cross direction 0.693 kilograms per cm. and Gurley porosity value of about 24.36 liters per minute per square decimeter meter at a pressure differential of 1.77 cm. of water (gage).

The finished sheet material contained about 4.24 kilograms of cobeat (of equal parts of cotton fibers and micro-bits), 0.3 kilograms of the polyethyelene terephthalate polyester (included to enhance the web's wet strength on leaving the Fourdrinier) about 0.91 kilograms of polyvinyl alcohol and 113.5 kilograms of glass fibers.

EXAMPLE 2

Preparation of Activated Carbon-Containing Sheet Material (i) Preparation of Polyester-Containing Cobeat: 318 kilograms (dry basis) of cellulose fibers (from 632 kilograms wet lap cotton rag fibers containing 50% moisture) and 159 kilograms (dry basis) of polystyrene micro-bits were charged into 11,455 liters of water in a pulper and agitated by its defibering rotor for 10 minutes to provide a uniform dispersion which then was transferred to a beater, and subjected to beating action for 4 hours after which it was found to have a freeness of 425.

190 liters of cellulose fiber and micro-bits slurry were uniformly admixed into 22,710 liters of water in the beater chest. Into the diluted slurry there was admixed 32 kilograms of the same polyethylene terephthalate polyester fibers used in Example 1, above.

The resulting suspension was transferred to the machine chest of a Fourdrinier machine, diluted to appropriate consistency, and discharged onto the Fourdrinier screen. The web thus produced was dried in the manner described in Example 1, above, to provide a storable form of cobeat.

(ii) Furnish Supply Suspension: A 10 kilogram sample of the polyester-containing cobeat was charged into a pulper containing 13,250 liters of water, along with 11.4 kilograms (dry basis) of polystyrene micro-bits, 122.5 kilograms of finely divided activated carbon (Nuchar-S-N, available from Westvaco Corp.), 6.4 kilograms of polyvinyl alcohol (98% hydrolyzed) powder, 3.8 liters of technical grade concentrated sulfuric acid (98.6%) and 9.1 kilograms of sodium hexametaphosphate. The pulper was operated with its defibering and circulatory rotor running at 800 r.p.m. for a period of 3 minutes to disperse the solids into a homogeneous slurry substantially free of clumps of the added materials.

With the rotor stationary there was admixed 45.4 kilograms each of a first type of glass fiber (1.27 cm. in length and 12 microns in diameter) and second type of glass fiber ( 0.49 cm. in length and 6 microns in diameter) and the mixing then resumed for about 17 minutes. The resulting glass fiber-containing dispersion then was transferred to the beater chest.

Into 1890 liters of water in the pulper there was admixed while stirring 91 liters of a 6% solids containing aqueous dispersion of cationic melamine-formaldehyde resin (described further hereinbelow). The mixing was continued for about 30 seconds and the resulting diluted melamine-formaldehyde resin dispersion was admixed into the beater chest contents. The pulper then was flushed with 1890 liters of water and the resulting wash water also was admixed into the beater chest.

The beater chest contents, at a dispersed solids consistency of 0.6%, was diluted to a suitable consistency and transferred as a homogeneous dispersion to the machine chest at temperature of 48.5° C. through a magnetic flow meter a rate of at 340.7 liters per minute to a Rice Barton open head box.

The slurry passed under the head box slice bar and was distributed (at a consistency of 0.05% and pH of about 3.5) in uniform spread and flow over the traveling Fourdrinier screen, having 78 strands in the travel direction and 50 strands across, and 18.47 meters long by 2.72 meters wide.

In addition to drainage through the screen, water was removed from the slurry as the screen passed over 5 Rice Barton friction boxes operated at 7.62 cm. Hg. The slurry now as a web (about 50% dry) continued at the same speed onto an endless belt conveyor and, after about 1.5 meters beyond the end of the screen, passed about 10 cm. below a battery (about 60.5 cm. long) of infrared lamps (52.4 kilowatts, at 3.8 amperes, 480 volts, single phase 60 cycle) providing at the mat surface a rheostat set temperature as high as 649° C. The exposure of the wet mat to such temperature for only about 2.4 seconds caused rapid dissolution of the PVA.

The partially dry web passed through a tunnel dryer (about 3.67 meters long by 1.83 meters wide) providing a temperature of about 121° C. and then alternated in sequence over one and then under the next of each of a series of six dryer drums (the first drum providing a temperature of 113° C. with the temperature increased at each of them that followed with the last drum mainatained at 127° C.), and on through an Overly dryer maintained at a temperature of 177° C. The finished sheet material leaving the Overly dryer (at 99% dryness) then was collected on a reel.

The resultant sheet material had a basis weight of 15.1 kilograms per 100 square meters and porosity of about 457.2 liters per minute per square decimeter at a pressure differential of 2.54 cm. of water (gauge). The tensile strength of the material in the direction of the screen was 5.55 kilograms per cm. and 2.95 kilograms per cm. in the transverse direction. The tensile strength was considerably greater than that of sheet material made without using the melamine-formaldehyde resin.

The wet strength of the sheet material of this example was 2.4 kilograms per cm. which also is very much higher than the wet strength of similar materials made without using a melamine-formaldehyde resin.

While the relative amount of any one of the different types of glass fibers used in the preceding examples may be increased with a corresponding reduction and even exclusion of another, increasing the content of the larger dimension glass fibers increases the porosity and should not be done to the complete elimination of the smaller dimension glass fibers if the resulting porosity of the sheet material will be too large to enable retaining the size particles which it is desired to remove from the inhaled air.

Increasing the ratio of the smaller dimension glass fibers on the other hand, tends to decrease the porosity of the sheet material. A decrease in porosity due to a relatively high ratio of smaller diameter glass fibers may be offset by increasing the micro-bits content, thereby enhancing porosity of the sheet material.

The polystyrene micro-bits used in making sheet materials in the above examples may be replaced in whole or in part by micro-bits of other expanded thermoplastic styrene-polymers, or of the expanded lower polyolefins, or of flexible polyurethanes.

The separate addition of micro-bits in Example 2 enhances the dispersion of the fibrous substances present in the furnish for preparing the sheet material of the invention and particularly the glass fibers. As a result, while the sulfuric acid and the sodium hexametaphosphate are added for dispersing the glass fibers, the amounts of each of these additives can be reduced and even eliminated with reliance on the micro-bits to disperse the glass fibers adequately.

The powdered polyvinyl alcohol used in Example 2 may be replaced, if desired, by PVA fibers. However, the sheet material of Example 2 has greater wet strength than the corresponding material in the preparation of which PVA fibers are used. Moreover, use of the PVA powder is favored by reason of its lower cost.

The Westvaco NUCHAR S-N activated carbon used in Example 2 may be replaced by various other activated carbons, for example, DARCO, available from I.C.I. (U.S.A.) Ltd., and the NORIT product of American Norit Co. Barneby-Cheney activated carbon from pecan nut shells is also effective. Furthermore, other particulate gas-adsorbent substances, such as crystalline molecular sieze particles or zeolite particles may be substituted for the activated carbon in Example 2. When molecular sieve particles are employed as the gas-adsorbent substance, a nominal pore diameter of about 4 to about 10 Angstroms is preferred.

Also the polyester of the foregoing examples may be replaced by any other fiber-forming terephthalate polyester, for example, FORTREL polyethylene terephthalate or by KODEL, dimethyl 1,4-cyclohexane dimethanol terephthalate. Any of the polyesters can be used in any available 1.5 and 3 denier diameters.

The aqueous colloidal solution of the cationic melamine-formaldehyde resin used in Example 2 in preparing the furnish comprises the resin colloidally dispersed as 6% solids in water, obtained by addition of water to a commerically obtained aqueous dispersion containing about 12.5% of the resin as solids resulting from the condensation in water of 3 mols of formaldehyde with one mol of melamine in the presence of 0.677 mol of hydrogen chloride, and having a pH of 1.4 and specific gravity of 1.052 at 25° C. and a hazy light blue color.

The colloidal melamine-formaldehyde resin includes those with from 1 to 6 methylol substituents, but the most commonly used are the di- or trimethylol substituted and particularly the dimethylol in Example 2 with the third mol of formaldehyde dissolved in the water.

The amount of cationic melamine-formaldehyde resin used is influenced by the overall composition of the furnish and the level of wet strength desired.

The sulfuric acid used in the above examples may be replaced by any other water-soluble acid, e.g. hydrochloric acid that will not adversely affect any of the substances to be used in preparing the furnish for the desired sheet material.

The following two examples describe techniques for making masks of the type illustrated in FIGS. 2 and 3 of the drawing.

EXAMPLE 3

A strip measuring approximately 40 cm. by 71 cm., was cut from a piece of the sheet material of Example 1. A piece of polyester of about 7 mil thickness, and containing polyvinyl alcohol as a binder, was cut to the same dimensions. The polyester was superimposed on the sheet material to provide a single two-ply sheet of the aforesaid dimensions. An opening approximately 5 cm. by 13 cm. was cut in the sheet about 15 cm. from the edge of the sheet, measured widthwise. The opening was covered with a piece of 0.16 cm. thick Lexan TM, measuring about 6.3 cm. by 14 cm., which was held in place by hot melt adhesive. The two-plies of the sheet material were then glued together along their peripheries using hot melt adhesive. The mask was formed by wrapping the two-ply sheet horizonitally lengthwise around a rectangular, box-like form measuring about 21.6 cm. long, 12.7 cm. wide and 30.5 cm. high, with the sheet material of Example 1 facing outward, and overlapping and sealing the edges with hot melt adhesive to form a sleeve. A sturdy adhesive tape, e.g. duct tape, was used in fabricating a similar mask and also provided a strong, durable seal. The upwardly facing opening of the sleeve was closed by folding and creasing the excess sheet material extending above the top of the form into a pair of flaps, folding the flaps down onto the top of the form and sealing the flaps together with hot melt adhesive.

The finished mask was similar in configuration to an inverted grocery bag. The remaining opening was hemmed and provided with a drawstring.

A mask formed of multi-ply sheet material, e.g. sheet material such as that just described but including a gas adsorbent-containing ply, for example, is conveniently prepared following the same general procedures.

EXAMPLE 4

A 30.5 cm. by 30.5 cm. piece of the sheet material prepared as described in Example 2 was wetted with water and placed on a hemispherical foraminous form approximately 20 cm. in diameter and an identical form was pressed down upon the sheet material, such that the sheet material was intermediate and conformed to the shape of the two hemispherical forming elements. The excess paper was trimmed and the assembly was placed in a hot air circulating oven set at 110° C. and dried for about one hour. A rectangular opening about one by four inches was cut in the mask to permit wearer vision. A piece of transparent plastic was placed over the opening and sealed along its periphery using a commerically available hot melt adhesive. An elastic fabric band was secured to the periphery of the mask to enable the mask to make sealing contact along its periphery with the wearer's face.

The following two examples demonstrated the effectiveness of the protective mask of the present invention for its intended use.

EXAMPLE 5

A mask prepared as described in Example 3 was tested at Lawrence Livermore National Laboratory (LLNL), University of California, Livermore, Calif. according to procedures used to determine the efficiency of filtration media for protection against radioactive dust, or, in other words, small particle filtration efficiency. The mask was worn by a human test subject in a gas-tight test chamber measuring 6 feet by 4 feet by 7 feet, which was filled with di-octyl sebacate smoke having an average particle size of about 0.6 microns.

The smoke concentrations within and without the mask were measured using a calibrated light scattering photometer. The response to the two photometers was designed to provide a direct measurement of the percent penetration of the smoke through the mask. The test subject performed a series of deep breathing exercises during the test period.

The test results showed that the mask exceeded the allowable minimum value of ninety percent efficiency established at LLNL for effective radioactive dust protection.

A similar mask formed from sheet material of the typed described in Example 2 of my U.S. Pat. No. 4,293,378 was subjected to the same test procedure with like results.

EXAMPLE 6

A mask prepared as described in Example 3 but formed of sheet material of the type described in Example 2, i.e. an activated carbon-containing sheet material, and including a third ply of the sheet material of Example 2 without a gas adsorbent substance, was worn by a human test subject in a 8 foot by 16 foot by 8 foot room in which the acrid odor of chlorine gas was evident. The test subject remained in the room for approximately 15 minutes with the mask on, during which time no penetration of chlorine gas through the mask was noticed by the test subject.

It is not intended to limit the present invention to the particular embodiments described and exemplified in the foregoing specification, but various modifications may be made therein and thereto without departing from the scope and spirit of the invention as set forth in the following claims.

What is claimed is:

1. A protective mask comprising a non-woven, air-permeable sheet material consisting essentially of glass fibers, a binding agent and polymer micro-bits derived from an expanded, non-brittle thermoplastic polymer selected from the group of a styrene polymer, a polyolefin having from 2 to 6 carbon atoms, or co-polymers or blends thereof, or micro-bits of a flexible foamed polyurethane, said polymer micro-bits being substantially completely free of intact cells of the expanded polymer from which they are produced; said sheet material being adapted to sealingly engage the wearer and envelop at least a portion of the face of the wearer, including the nose and mouth; and means for securing the mask in place during use.

2. The protective mask of claim 1, wherein the binding agent is an organic chemical binder.

3. The protective mask of claim 1, wherein the binding agent is a cobeat of cellulose fibers and polymer micro-bits being derived from an expanded, non-brittle thermoplastic polymer selected from the group of a styrene polymer, a polyolefin having from 2 to 6 carbon atoms, or copolymers or blends thereof, or micro-bits of a flexible foamed polyurethane, said polymer micro-bits being substantially completely free of intact cells of the expanded polymer from which they are produced.

4. The protective mask of claim 3, in which said cobeat of polymer micro-bits and cellulose fibers comprises one part of polymer micro-bits and from one to two parts of cellulose fibers.

5. The protective mask of claim 3, which includes an organic chemical binder.

6. The protective mask of claim 5, which includes fibrous additive for imparting tear strength thereto.

7. The protective mask of claim 6, wherein said fibrous additive comprises polyester terephthalate fiber.

8. The protective mask of claim 3, in which said sheet material includes a fibrous additive for imparting tear strength thereto.

9. The protective mask of claim 8, wherein said fibrous additive comprises polyester terephthalate fiber.

10. The protective mask of claim 8, which includes polymer micro-bits derived from an expanded, non-brittle thermoplastic polymer selected from the group of a styrene polymer, a polyolefin having from 2 to 6 carbon atoms, or copolymers or blends thereof, or micro-bits of a flexible foamed polyurethane, said polymer micro-bits being substantially completely free of intact cells of the expanded polymer from which they are produced, the amount of said polymer micro-bits being in addition to those comprising the cobeat.

11. The protective mask of claim 10, wherein said sheet material includes an organic chemical binder.

12. The protective mask of claim 11, including a gas adsorbent substance distributed throughout the enveloping portion of said sheet material.

13. The protective mask of claim 11, in which said sheet material includes a wet strength enhancing agent.

14. The protective mask of claim 13, wherein said wet strength enhancing agent is a melamine-formadehyde resin.

15. The protective mask of claim 13, including a gas adsorbent substance distributed throughout the enveloping portion of said sheet material.

16. The protective mask of claim 1, wherein said glass fibers measure between about 0.1 inches and 0.25 inches in length and about 0.5 microns and 4 microns in diameter.

17. The protective mask of claim 1, wherein said mask is smaller than the head of the wearer and is provided with sealing means to engage the skin of the wearer along the periphery of the enveloping portion of said sheet material.

18. The protective mask of claim 17, in which the sheet material envelops the entire head of the wearer and is provided with means for drawing said sheet material snugly around the neck of the wearer.

19. The protective mask of claim 18, in which the enveloping portion of said mask, other than the window, comprises sheet material consisting essentially of glass fibers, styrene-polymer micro-bits, at least a portion of said polymer micro-bits being intimately blended with cellulose fibers to form a cobeat, and an organic chemical binder.

20. The protective mask of claim 19, wherein said sheet material includes a fibrous additive for imparting tear strength thereto.

21. The protective mask of claim 20, wherein said fibrous additive comprises polyester terephthalate fibers.

22. The protective mask of claim 20, in which the enveloping portion of said mask includes a gas adsorbent substance selected from finely divided activated carbon particles, crystalline molecular sieve particles or zeolite particles.

23. The protective mask of claim 22, in which the enveloping portion of said mask includes anion exchange resin particles.

24. The protective mask of claim 20, wherein said styrene polymer micro-bits are of polystyrene, said binder is polyvinyl alcohol and said fibrous additive is polyethylene terephthalate.

25. The protective mask of claim 24, in which the enveloping portion of said mask includes finely divided activated carbon particles.

26. The protective mask of claim 1, wherein the sheet material envelops a major portion of the face of the wearer, including the eyes, said sheet material having an opening to permit wearer vision and including a transparent window sealed within said opening.

27. The protective mask of claim 25, including an adsorbent-free, porous material applied to the side of the sheet material facing the wearer.

28. The protective mask of claim 1, wherein said sheet material comprises a plurality of plies, at least one ply having an average pore size effective for removing from the inhaled air particulate matter having a particle size of 0.3 microns or greater, and at least one other ply containing a gas adsorbent substance, in an amount sufficient for removing from the inhaled air toxic gases or vapors.

* * * * *